June 24, 1930.  F. A. KOLSTER  1,767,141
RADIO COMPASS SYSTEM
Filed May 11, 1927
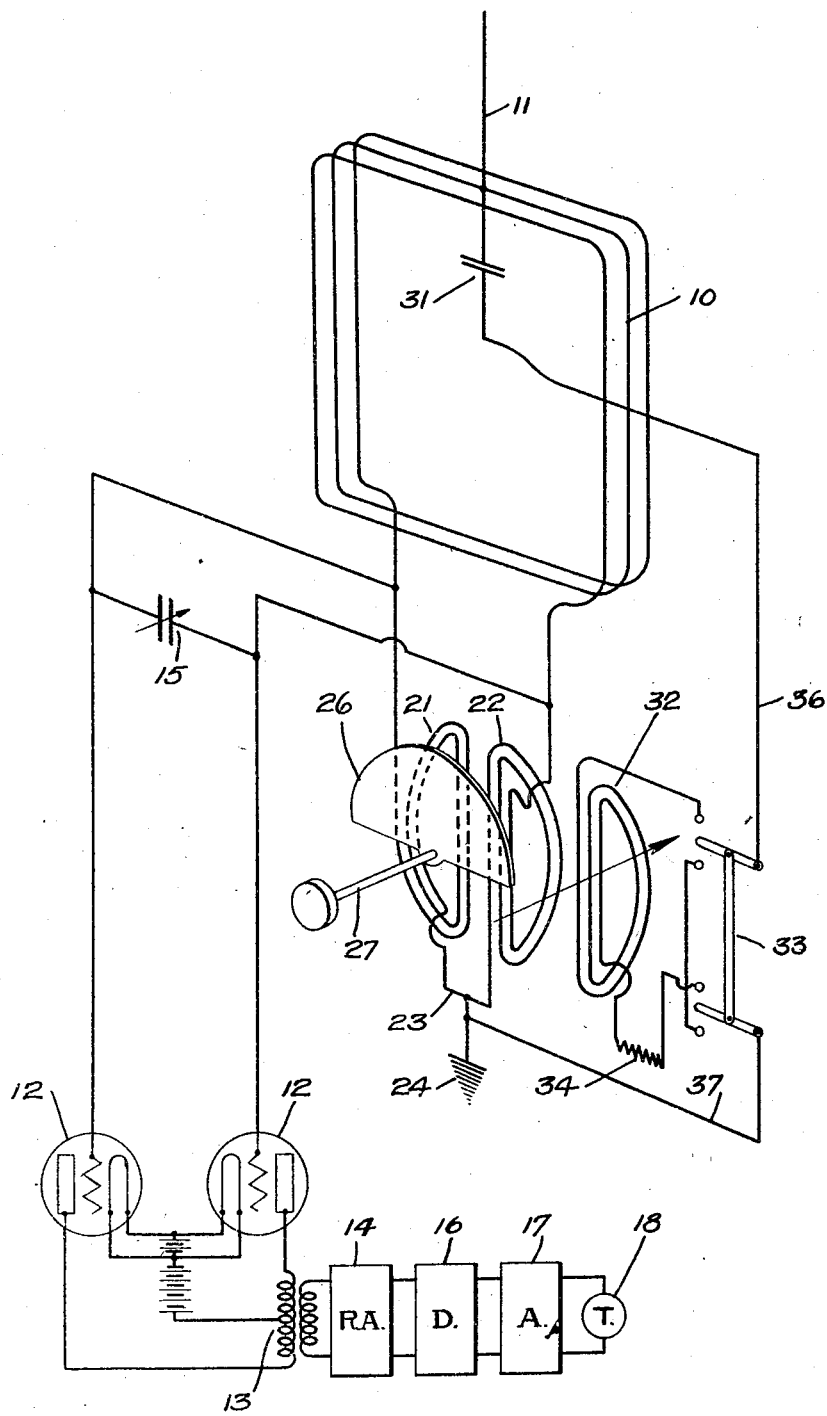
INVENTOR
Frederick A. Kolster.
BY
White, Prost & Fryer
his ATTORNEYS.

Patented June 24, 1930

1,767,141

UNITED STATES PATENT OFFICE

FREDERICK A. KOLSTER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

RADIO COMPASS SYSTEM

Application filed May 11, 1927. Serial No. 190,634.

This invention relates generally to systems for effecting directional radio signaling and has special application to radio compass or direction determining radio receiving systems.

Radio compass installations commonly utilize a loop antenna mounted to swing about a vertical axis. A loop antenna receives energy most effectively in the direction of the plane of its loop, and this characteristic is utilized to determine the direction of a source of signal energy, such as a beacon transmitter. In making bearing observations, it is desirable to utilize the position of minimum rather than maximum response, as more accurate results may be obtained. After determining a line which indicates the relative position of a beacon transmitter, the loop antenna is usually combined with a non-directional antenna in order to determine the actual direction, thus avoiding 180° inaccuracies. It is obvious however, that the accuracy of a radio compass of this sort depends upon how sharply the minimum response may be obtained, and this in turn depends upon how closely the loop corresponds to its conventional figure eight characteristic. A true figure eight characteristic can only be obtained when the two halves or branches of a loop are in perfect balance.

It is accordingly an object of this invention to devise a radio compass system incorporating a novel means for balancing the branches of a loop antenna.

It is a further object of this invention to incorporate with a loop antenna a balancing device comprising an inductance which is divided into two sections, the sections being simultaneously and oppositely variable without the use of sliding contacts.

Further objects of this invention will appear from the following description in which I have set forth the preferred embodiment of my invention. It is to be understood that the appended claims are to be accorded a range of equivalents consistent with the state of the prior art.

The single view of the drawing illustrates diagrammatically a radio compass system incorporating the principles of this invention.

The particular embodiment of the invention shown in the drawing includes a loop antenna 10, which for radio compass use consists of a number of turns of wire wound upon a frame which is pivotally mounted to rotate about a vertical axis. The central turn or midpoint of the loop is shown as connected to a non-directional antenna 11. The two terminals of the loop are connected to a suitable receiving circuit, which in this instance includes a pair of electron relays 12, having their grids connected respectively to the loop terminals. A center tapped inductance 13 is included in the output circuits of relays 12, and to this inductance is coupled the remainder of the receiving apparatus which may include for example a radio frequency amplifier 14, detector or integrating device 16, audio frequency amplifier 17, and a suitable indicating or translating means 18.

The device for balancing the two branches of the loop, includes an inductance formed in two sections 21 and 22, which are preferably in the form of D-shaped coils. These coils are wound oppositely and are connected together in series across the loop terminals. The conductor 23 which connects between the coils, is connected to a suitable counterpoise or ground 24. The two coils 21 and 22 are disposed in a common plane with their flat edges in spaced parallel relationship as shown. The inductance of each of coils 21 and 22 is varied simultaneously and oppositely by means of a metal inductor plate 26 which is preferably disposed so as to move in a plane parallel to the plane of coils 21 and 22, and sufficiently close thereto to have a substantial influence upon their inductance by virtue of eddy currents induced in the plate. For example I prefer to form the inductor plate in the form of a semi-circular segment and to pivot the same upon a control shaft 27, the axis of shaft 27 being substantially normal to the plane of coils 21 and 22. This plate is made of a metal which is a good electrical conductor, such as copper. As the control shaft 27 is rotated, the inductance value of one coil is gradually increased, while the inductance of the other coil is decreased substantially the same amount. However the total series inductance of the two coils will remain substantially constant for different adjustments of the shaft 27, and the only effect of such adjustment is to change the electrical balance between the two halves or branches of the loop antenna.

In operating this apparatus the non-directional antenna 11 is initially grounded through a condenser 31, and shaft 27 is adjusted by the operator to secure a perfect electrical balance between the two loop branches. The operator will know when the loop is properly balanced by the degree of sharpness of the minimum response position. At this time the signal receiving apparatus is of course tuned to receive the radio energy from a certain beacon transmitter, as by means of the variable condenser 15, and any other tuning devices which may be used in conjunction with the radio frequency amplifier 14. After the position of perfect balance has been obtained, a transfer of energy is secured between the non-directional antenna and the loop in order to cause the system to assume the characteristics of a cardioid. In this instance, an exchange of energy is secured by means of an inductance coil 32, which is arranged in inductive relationship with one of coils 21 or 22. The terminals of this coil are connected through suitable switching means so that this coil may either be connected in series with the ground connection and condenser 31, or condenser 31 may be connected directly to the ground to the exclusion of coil 32. For example, I have shown a double pole, double throw switch 33, having two of its contacts connected to the terminals of coil 32, a suitable resistance 34 being connected in series with the same. The other contacts of the switch are connected together, and the movable members or blades of the switch are connected to condenser 31 and ground 24 by means of conductors 36 and 37 respectively. When a balance is being obtained between the two loop branches, switch 33 is thrown to a position to directly connect conductors 36 and 37 together, and after this adjustment has been secured and it is desired to cause the system to assume a cardioid characteristic, switch 33 is thrown to connect coil 32 and resistance 34 in series with conductors 36 and 37, thus effecting a transfer of energy between the non-directional and the loop antenna. With the switch in this latter position the true direction of the beacon transmitter may be obtained in taking bearing positions.

The particular advantage residing in the use of a movable inductor plate, is that it dispenses with the use of taps or sliding contacts and makes possible an extremely accurate balance between the two loop branches. In other words it has been found possible with this apparatus to cause the loop characteristics to more nearly approximate a figure eight so that practically no energy will be absorbed along an axis perpendicular to the plane of the loop. Thus the factor of error of a radio compass incorporating this invention is materially reduced.

I claim:

1. In a radio signaling system, a directional loop antenna, an inductance connected across the terminals of said loop, a ground connection to said inductance whereby the inductance is divided into two sections, and means including a movable inductor plate for simultaneously and oppositely varying the inductance of each section.

2. In a radio compass system, a directional loop antenna, an inductance including a pair of D-shaped sections connected across said loop, a ground connection imposed between said sections, and a metal sector plate rotatably mounted to move in inductive relationship with said sections whereby said sections may be simultaneously and oppositely variable without materially affecting the total inductance of the two sections.

3. In a radio signaling system, a directional loop antenna, an inductance connected across the terminals of said loop, a ground connection to said inductance whereby the inductance is divided into two sections, and an inductor plate rotatably mounted to move in inductive relationship with said inductance, said plate serving to simultaneously and oppositely vary the inductance of said sections.

4. In a radio signaling system, a directional loop antenna, a nondirectional antenna, an electrical connection between said antenna whereby the loop antenna forms two parallel branches for energy in the non-directional antenna, an inductance connected across the terminals of said loop, a ground connection to said inductance serving to divide the same into two sections, and an inductor plate movable in inductive relationship with said inductance whereby the inductance of said sections are oppositely and simultaneously variable to vary the balance between said branches.

5. In a radio compass system, a rotatable loop antenna, a signaling circuit coupled to said antenna, a pair of series inductances connected across the terminals of said loop, a non-directional antenna, a ground connection, said non-directional antenna and ground being connected across two points of said system, one of said points being the connection between the inductances and the other of said points being the mid-point of the loop, whereby the loop is divided into two branches, and means for varying the balance between said branches comprising an inductor plate movable oppositely with respect to said inductances.

6. In a radio compass system, a rotatable loop antenna, a signaling circuit coupled to said antenna, a pair of series inductances connected across the terminals of said loop, a non-directional antenna, a ground connection, said non-directional antenna and ground being connected across two points of said system, one of said points being the connection between the inductances and the other of said points being the midpoint of the loop, whereby the loop is divided into two branches, means for varying the balance between said branches comprising an inductor plate movable oppositely with respect to said inductances, a circuit connected between said antenna and ground, and an inductance inserted in said circuit and coupled to one of said pair of inductances.

7. In a radio compass system, a directional loop antenna, an inductance in circuit between terminals of said loop, a ground connection to said inductance dividing it into two sections, means simultaneously and oppositely varying the inductance of each section, an open antenna path, and inductance in said path magnetically coupled to said first inductance.

In testimony whereof, I have hereunto set my hand.

FREDERICK A. KOLSTER.